United States Patent [19]

Chika

[11] 4,217,970
[45] Aug. 19, 1980

[54] CONFIGURATION AND CONSTRUCTION OF FOUR WHEELED MOTOR VEHICLES

[76] Inventor: John J. Chika, 1350 Orchard Ridge Rd., Bloomfield Hills, Mich. 48013

[21] Appl. No.: 857,568

[22] Filed: Dec. 5, 1977

Related U.S. Application Data

[63] Continuation-in-part of Ser. No. 437,482, Jan. 28, 1974, abandoned.

[51] Int. Cl.² ............... B62D 21/12; B60K 17/00
[52] U.S. Cl. ............... 180/298; 180/74; 180/89.1; 280/96; 296/205; 296/188
[58] Field of Search ............... 280/203, 202, 209, 215, 280/282, 7.16, 96, 747, 750, 751, 752, 808; 180/33 D, 33 R, 64 MM, 74, 298, 89.1; 296/28 J, 64, 63, 205, 188, 104, 137 B; 188/5, 6

[56] References Cited

U.S. PATENT DOCUMENTS

| | | | |
|---|---|---|---|
| 784,042 | 3/1905 | Fowler | 280/96 |
| 2,625,230 | 1/1953 | Burkhardt | 180/64 MM |
| 2,691,421 | 10/1954 | Swanson | 180/74 |
| 2,891,804 | 6/1959 | Frayne et al. | 280/747 |
| 3,429,584 | 2/1969 | Hendricks | 188/5 |
| 3,435,701 | 4/1969 | Bucher | 280/750 |
| 3,517,764 | 6/1970 | Wendt | 180/33 R |
| 3,794,352 | 2/1974 | Popp | 280/209 |
| 3,887,210 | 6/1975 | Funke | 188/5 |
| 3,894,615 | 7/1975 | Lew | 280/215 |
| 3,941,075 | 3/1976 | Rupenian | 280/215 |
| 3,951,427 | 4/1976 | Wilfert | 280/752 |
| 3,961,807 | 6/1976 | Maki et al. | 280/747 |
| 4,028,957 | 6/1977 | Wright | 280/96 |
| 4,093,258 | 6/1978 | Ansel | 280/209 |

FOREIGN PATENT DOCUMENTS

| | | | |
|---|---|---|---|
| 121044 | 5/1901 | Fed. Rep. of Germany | 280/209 |
| 971572 | 1/1951 | France | 296/28 J |
| 18531 | of 1898 | United Kingdom | 180/33 |
| 728346 | 4/1955 | United Kingdom | 296/28 J |
| 1078535 | 8/1967 | United Kingdom | 280/209 |

*Primary Examiner*—David M. Mitchell

[57] ABSTRACT

A four-wheeled motor vehicle constructed by operatively coupling two exclusively configured left and right longitudinal side structures by plural, transversely positioned connecting and bracing members. Each side structure operatively supported by its own front wheel adapted for steering and rear wheel adapted for propelling the vehicle. Each of the connecting members comprising a longer mid-portion positioned transversely between the two longitudinal sides, and two shorter end-portions which are secured to correspondingly positioned structurally rigid sections of them. Steering system operatively couples the two front wheels of the two sides for steering thus coupled vehicle. A propulsion plant propels at least one of the wheels. All operating controls are configured for safe and legal operation of the vehicle by its driver. The longer mid-portions of said connecting members support body panels positioned intermediate the two side structures, vehicle floor and seats. The basic configuration is adaptable to be combined into variously configured, open, closed and convertible vehicle bodies. Various facets of the basic concept are adaptable for partial application in construction of new and conversion of existing conventionally constructed motor vehicles of all types.

65 Claims, 49 Drawing Figures

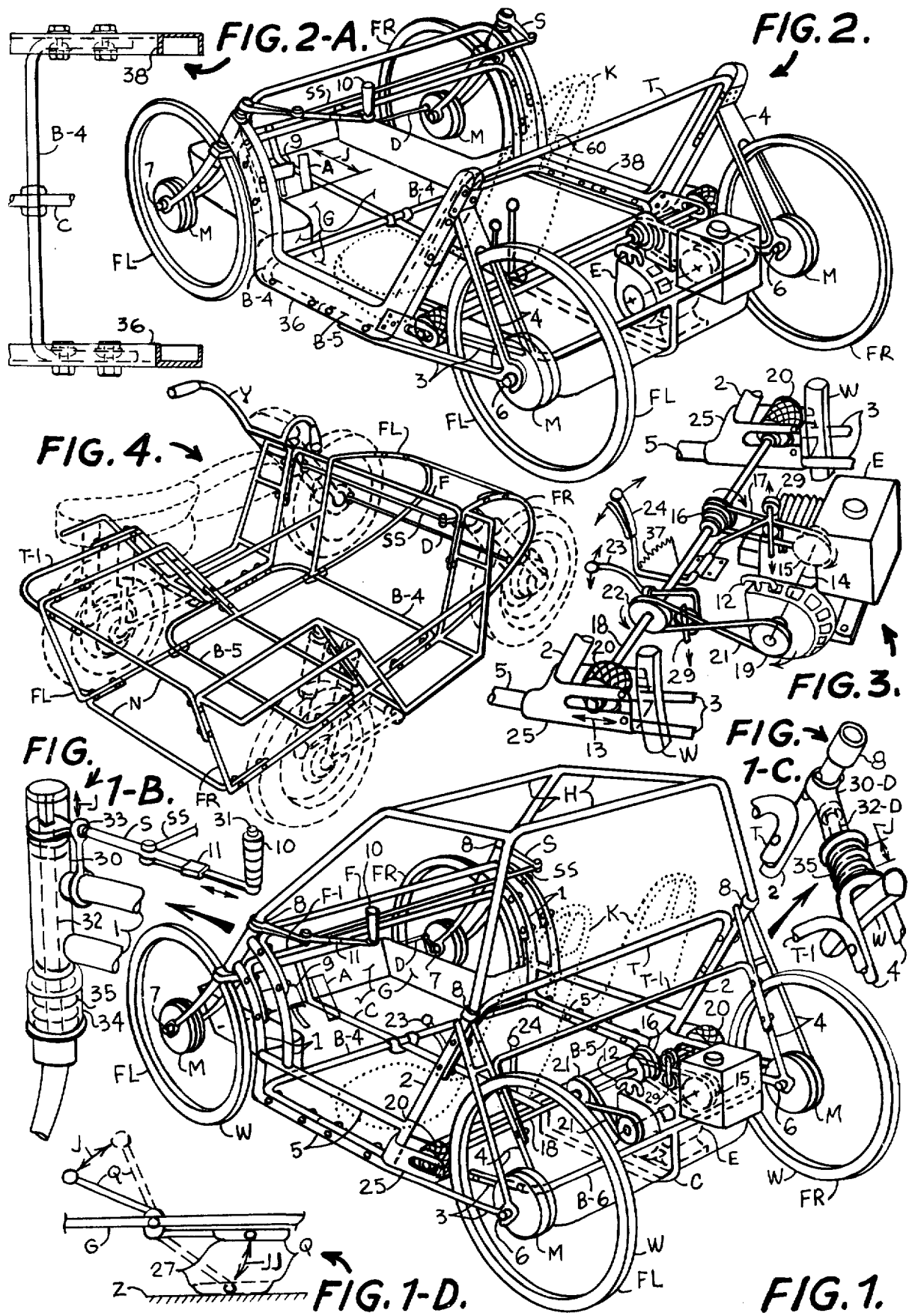

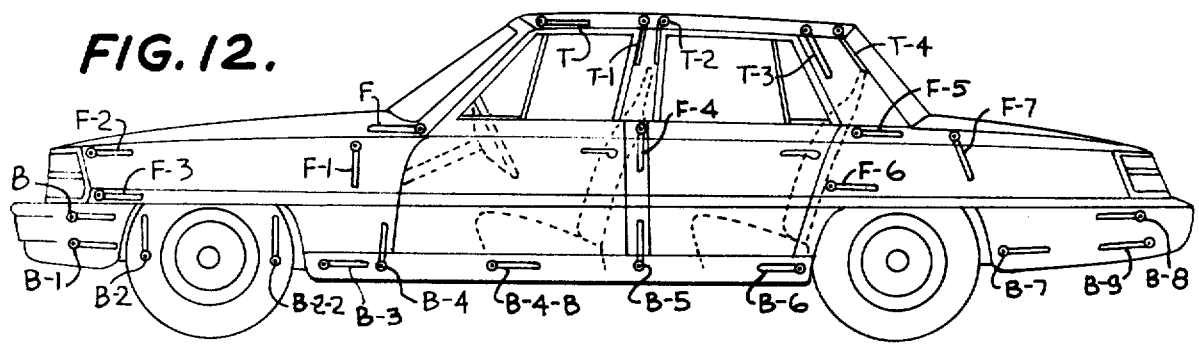
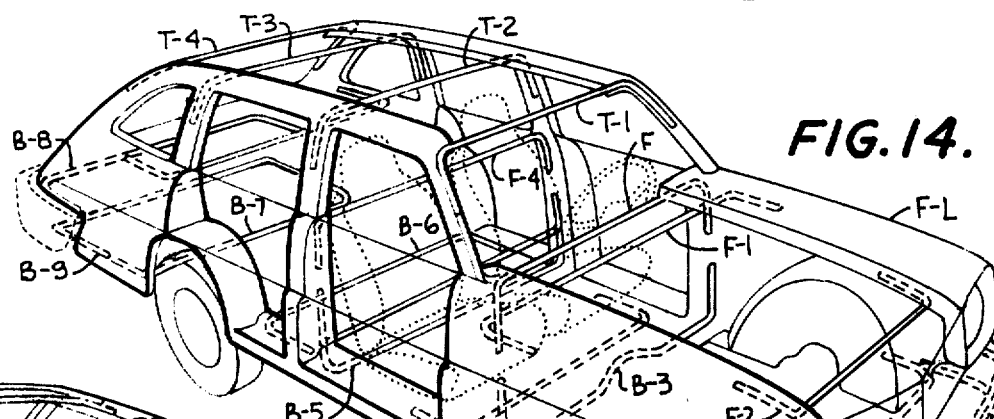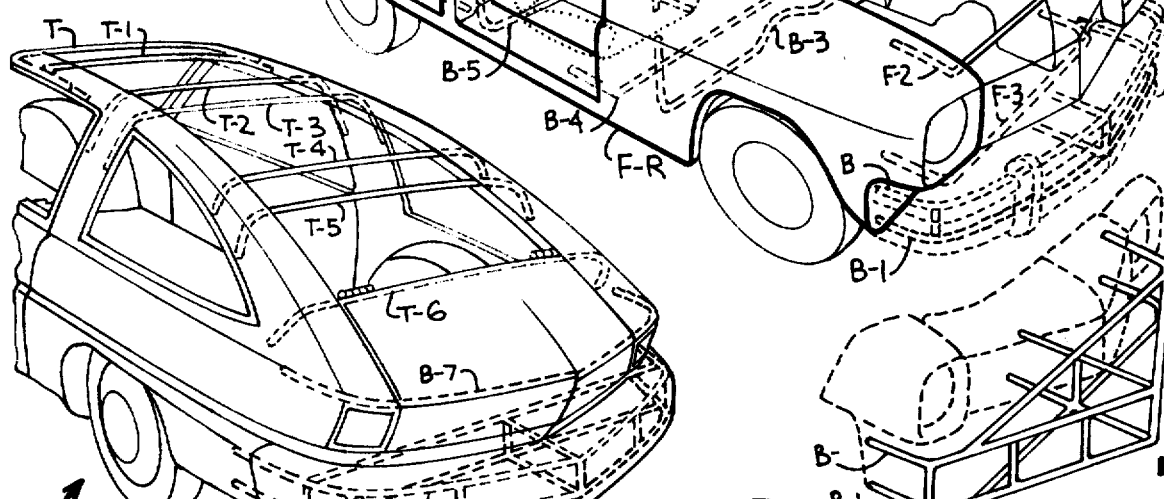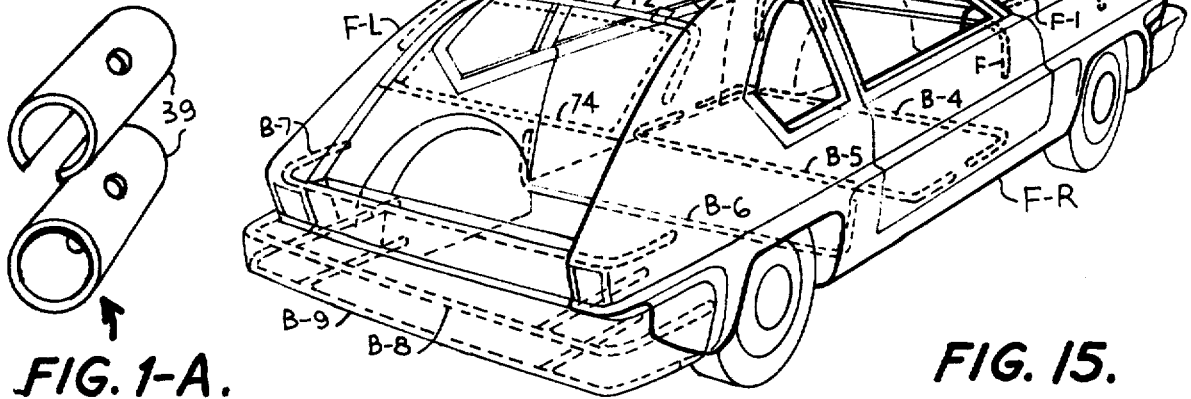

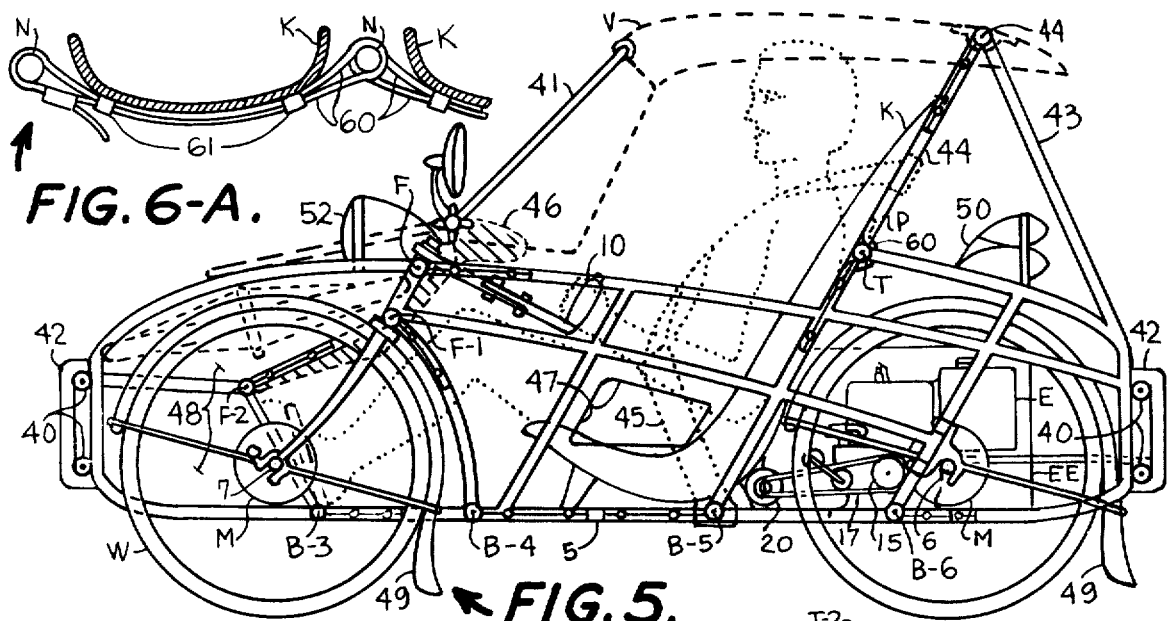
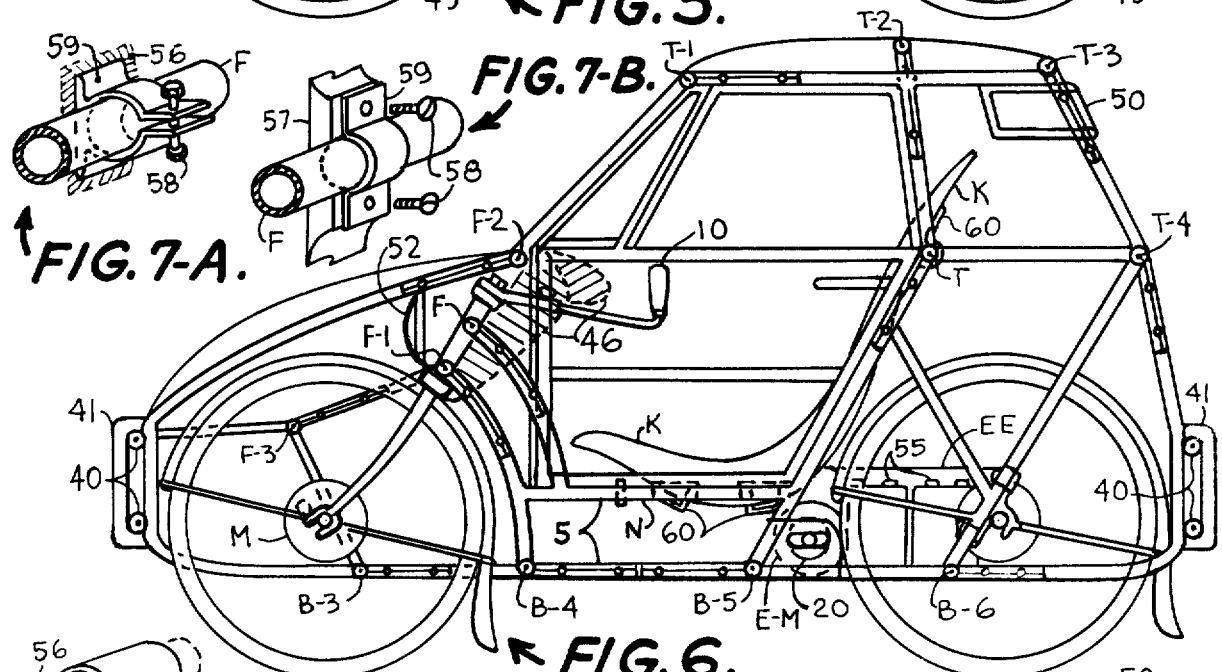
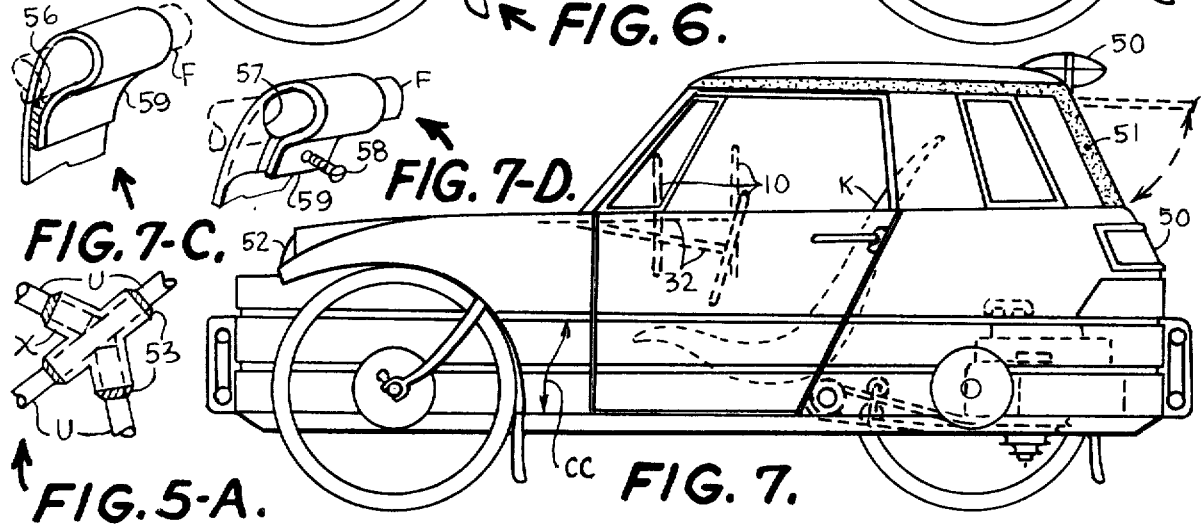

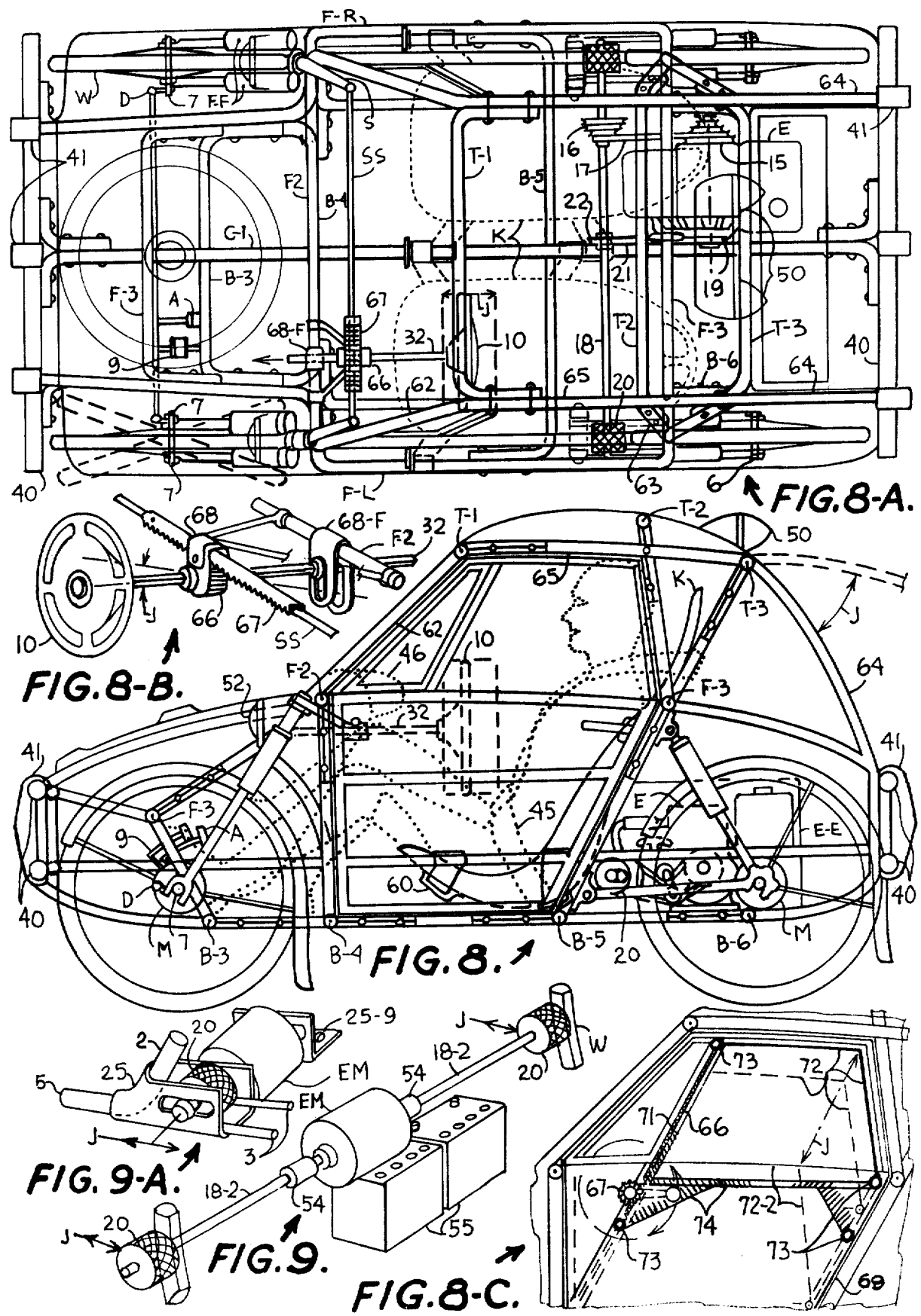

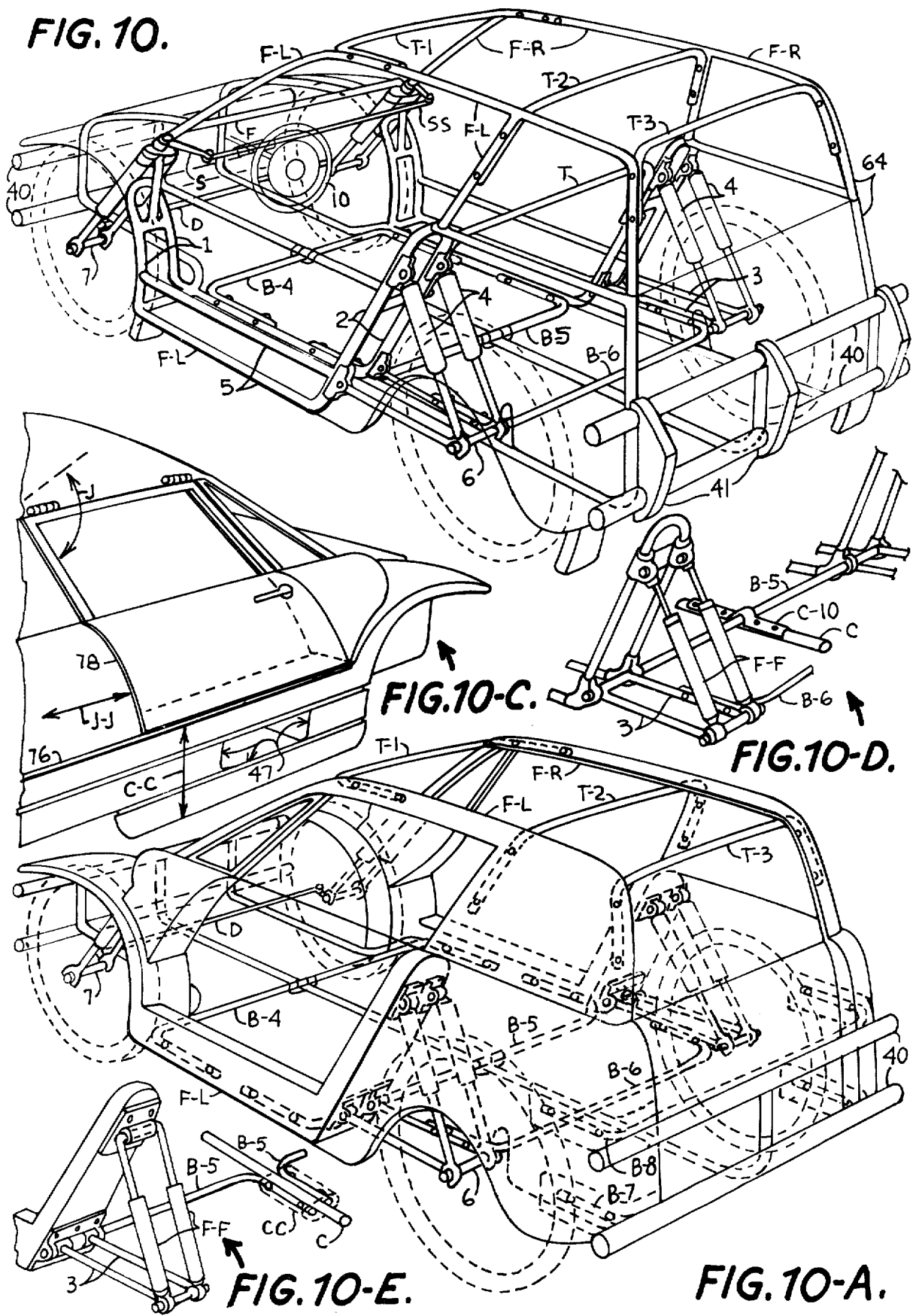

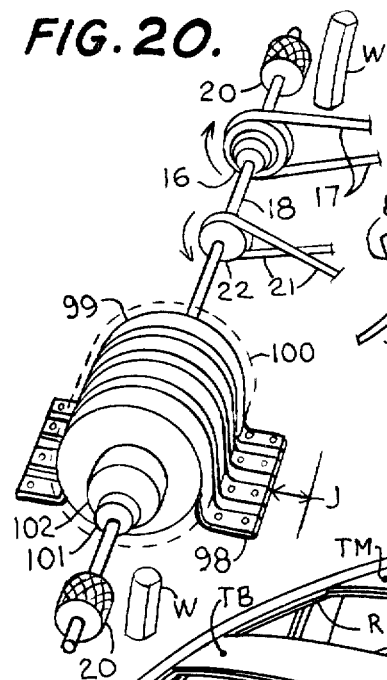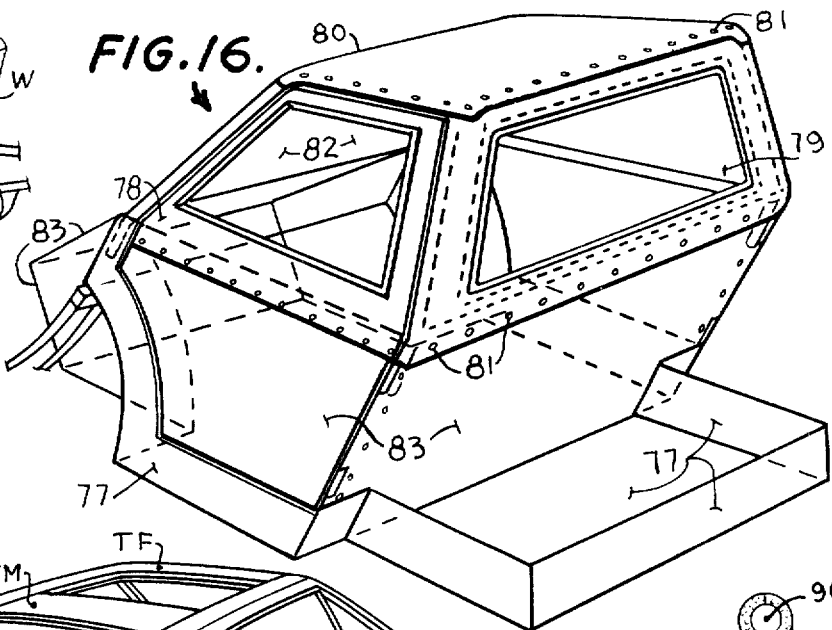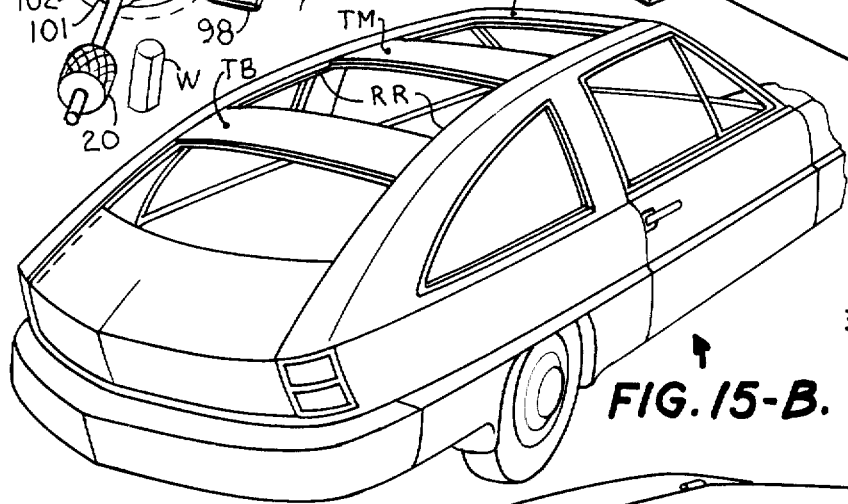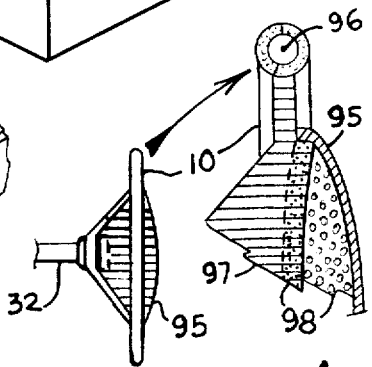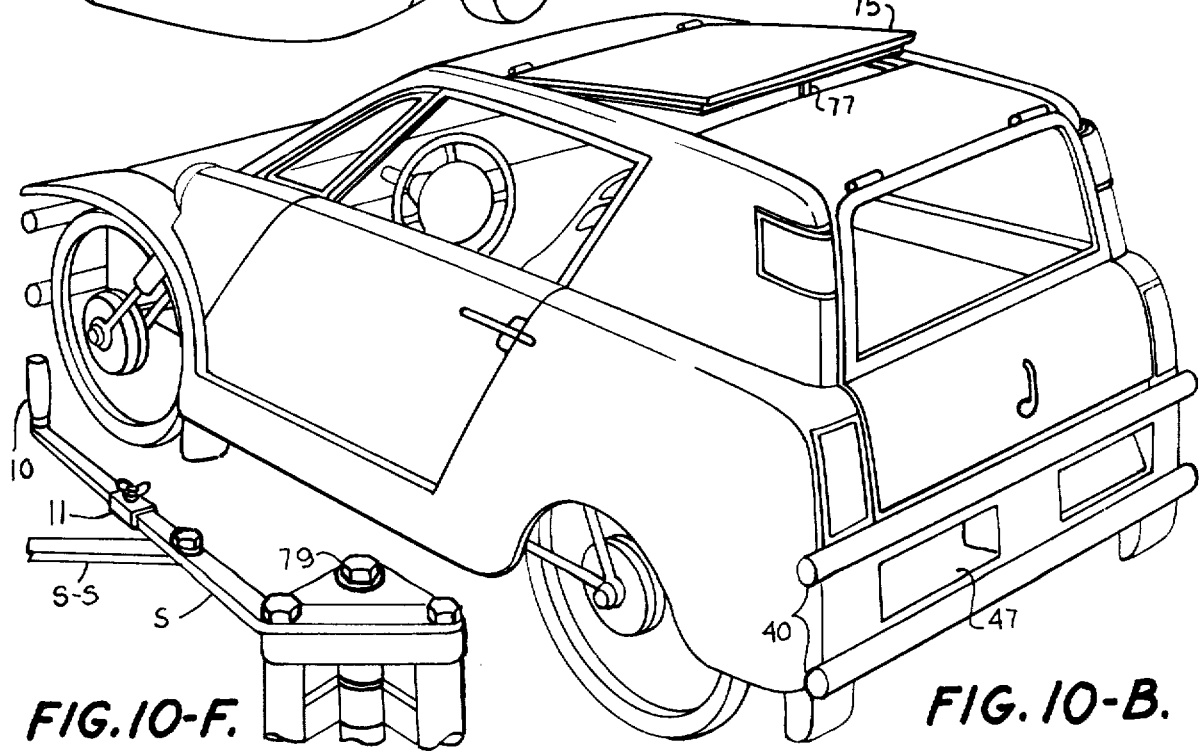

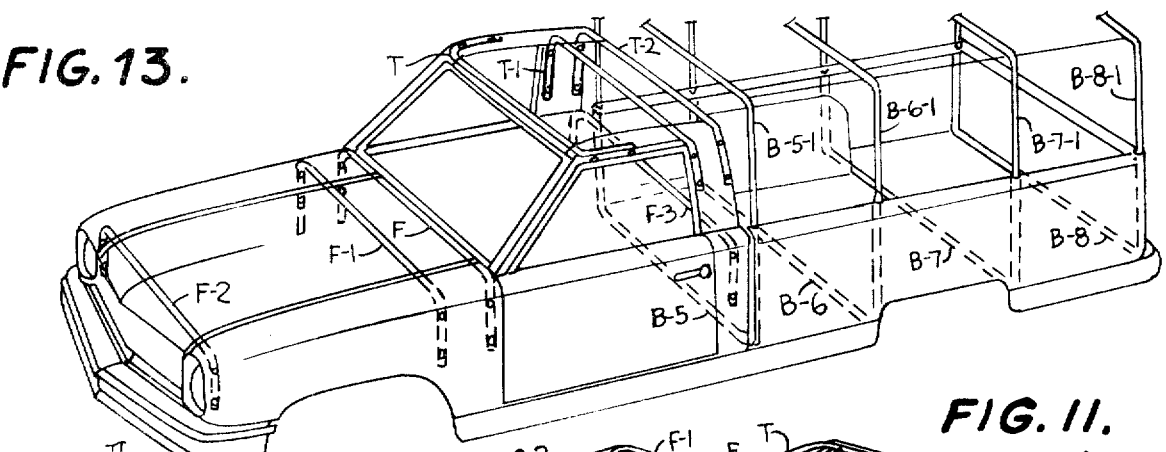
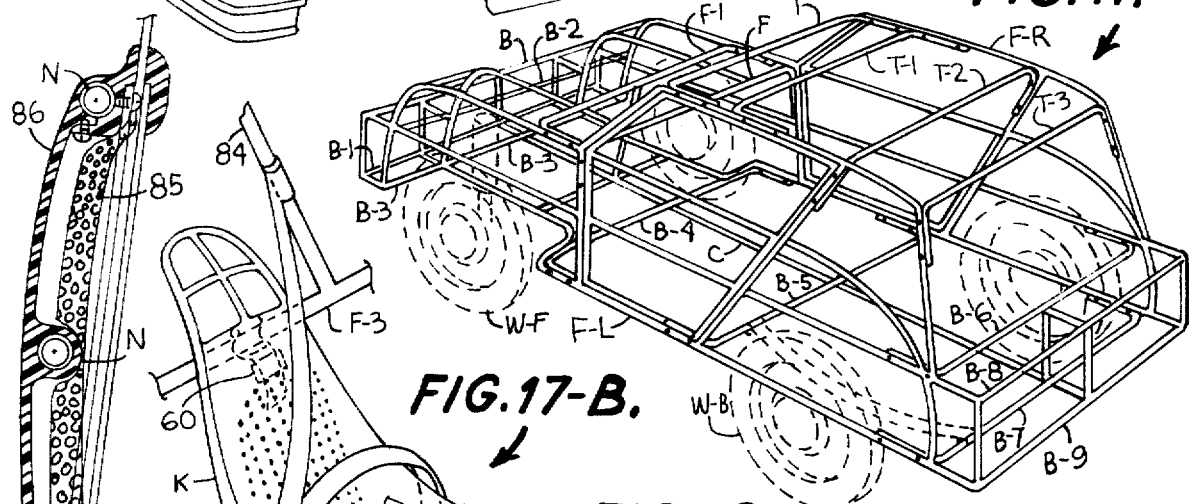
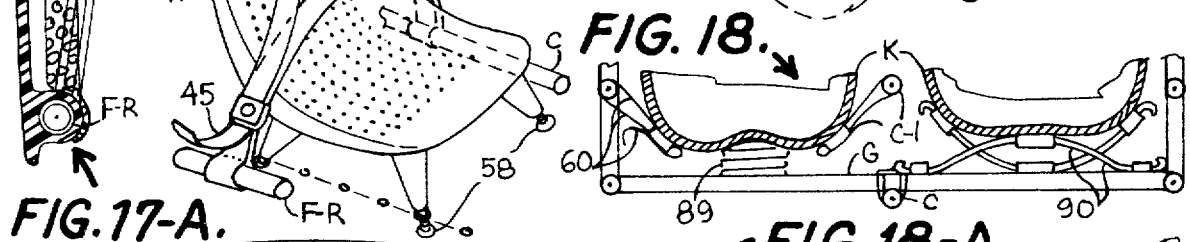
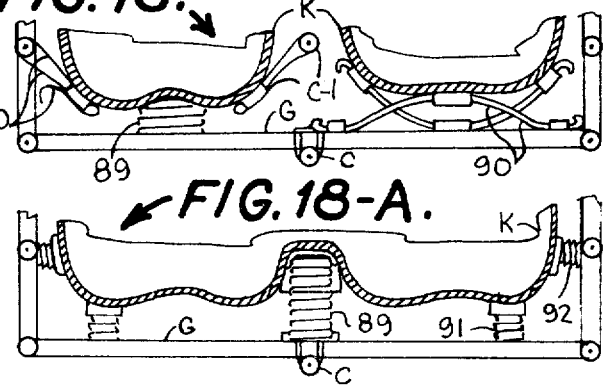
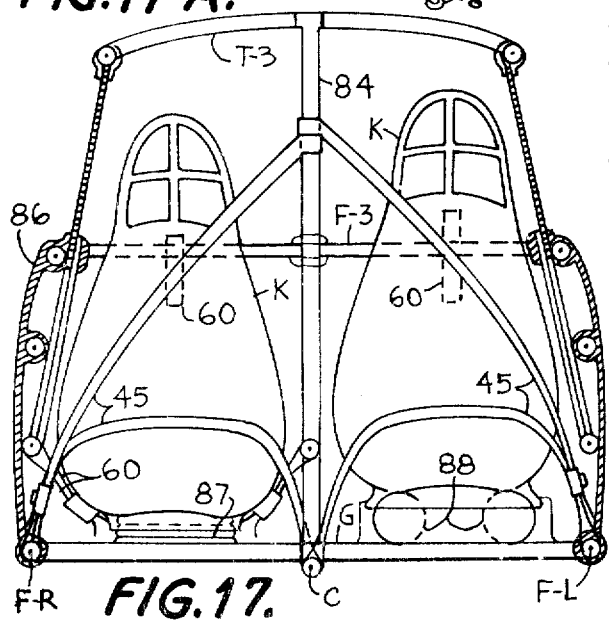
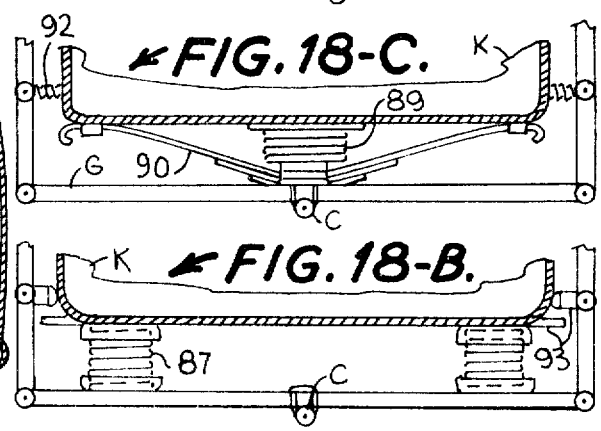

CONFIGURATION AND CONSTRUCTION OF FOUR WHEELED MOTOR VEHICLES

This application is a continuation-in-part of my copending application Ser. No. 437,482 filed Jan. 28, 1974, entitled APPARATUS FOR CONSTRUCTING TORSIONALLY RESILIENT VEHICLES.

BACKGROUND OF THE INVENTION

The first automobiles were nothing but "horseless carriages" and their frame structures were based on the concept of wagons and carriages of those days with little consideration for speed and collision related aspects as we known them today; this conceptual philosophy persists in most cases to this day and it is only since the energy crisis that the tendency to smaller, lighter and more efficient vehicles is being considered from different approaches. This disclosure reveals one of such radical concepts based on the fundamentally sound and proven principle of the BICYCLE which can carry up to ten times its weight in useful cargo.

The existing automobiles are usually constructed in one of three ways: 1. Separate bodies bolted to very heavy inboard frames; 2. Unitized bodies with proper extensions and reinforcements to support their wheels and bumpers; and 3. Endless combinations of the two above principles. This invention is based on the precept of dividing the vehicle longitudinally into three sections: the two side portions, each one rigid enough by itself not only to functionally and operatively accommodate its front and rear wheels, but the two sides configured rigid and strong enough to support the total weight of the complete vehicle and its intended cargo between them; the two thus configured and constructed sides are operatively and functionally connected by plural rigid, torsionally resilient and specifically bent connecting members serving as the bracing and supporting spacer means between them and functionally and operatively combined with them to produce an efficient, road worthy automobile structure able to transport its passengers and cargoes between thus interconnected sides; and its front and back facing side are reinforced by plurality of the same type of transverse connecting means functioning as front and back bumper supporting means.

SUMMARY OF THE INVENTION

In U.S. Pat. No. 3,997,209 a specially reinforced system of body panels is proposed to establish a collision resistant "common contact zone" at which any colliding vehicles could contact any impacting object; the present invention developes this concept even further by practically positioning the frame or the strongest members of its structure at its periphery where it will be most effective in protecting its occupants and cargo from any severe effects of any collision of the vehicle, thus extending the protection over the whole exterior of the body. The present day embodiments of body frames are either nonexistent or are positioned so low and so far inboard from the outside periphery of the vehicle body whereby they allow the impacting object to penetrate and entangle itself in the relatively soft and crushable exterior body sections.

Therefore the paramount objective of this invention is to place most rigid structural members of the body frame on its outside contours where they will be most effective in deflecting or absorbing any collision impact against the vehicle before it becomes dangerous to its occupants.

Equally great objective is to construct the most economical and safe vehicle which will decrease the overall cost of personal transportation; this type of vehicle could transport at least twice its weight in useful cargo, while existing vehicles cannot carry a payload equal to half their weight.

The general, all-inclusive objective is to create entirely new type of motor vehicle by producing rigid left and right vehicle sides using either tubular construction or large, specifically reinforced stampings or molded panels of synthetic materials and transversely interconnecting them by the presently disclosed torsionally resilient members to create a light vehicle chassis and body structure and covering the spaces between thus interconnected sides with hood, roof and trunk panels of any suitable materials to enclose and protect thus configured body from elements and pilferage as is presently done with existing motor vehicles.

Another very important objective is to eliminate the heavy engine, transmission, power train and rear axle of the vehicle chassis by using air cooled engines whenever possible and transferring their power to vehicle wheels by the direct "RIM-DRIVE" principle, which allows engines of very small horsepower to apply much greater torque to the driven wheels, thus increasing the vehicle capabilities.

To save energy, a kinetic energy gathering, storing and releasing means is provided which saves some of the energy normally wasted whenever brakes of present day vehicles are applied.

Still another object is to construct a vehicle which will protect itself in any collision with any object by positioning its strongest structural elements at those parts of its outside periphery where such unwanted contacts are most likely to occur, and especially protecting the "travel capsule" of its occupants.

Finally, by making the transverse connecting members easily attachable and detachable, most parts of thus conceived and constructed vehicle may be easily removed for repair or replacement instead of scrapping the whole vehicle after its collision.

These and many other advantages of this invention will become more apparent upon consideration of the following specification and accompanying drawings wherein like characters of reference designate substantially corresponding parts through several embodiments and configurations of this disclosure in which:

FIG. 1 is a perspective view of the most elementary concept;

FIG. 1-A shows sleeve type of bushings;

FIG. 1-B is a detail view of front wheel suspension means;

FIG. 1-C is a detail view of rear wheel suspension means;

FIG. 1-D is a view of primitive emergency brake means;

FIG. 2 is a perspective view of another basic vehicle concept;

FIG. 2-A shows a typical transverse connecting member securement;

FIG. 3 is a perspective view of a power train;

FIG. 4 is a perspective view of a motorcycle embodiment;

FIG. 5 is a side phantom view of another embodiment;

FIG. 5-A is a detail view showing lugging means for joints;

FIG. 6 is a side phantom view of electrically powered vehicle;

FIG. 6-A shows a seat suspension means;

FIG. 7 is a side phantom view of still another embodiment;

FIGS. 7-A,B,C and D are detail views of various fastening means;

FIG. 8 is a side phantom view of different embodiment;

FIG. 8-A is a plan view of vehicle shown in FIG. 8;

FIG. 8-B is a perspective view of rack and pinion steering means;

FIG. 8-C shows the door window operative system;

FIG. 9 shows an electrical type of power train;

FIG. 9-A shows one wheel type of electric drive embodiment;

FIG. 10 shows tubular type of body frame configuration;

FIG. 10-A shows a body configured of stampings;

FIG. 10-B shows an outside appearance of body in FIGS. 10, 10-A;

FIG. 10-C shows door opening systems;

FIG. 10-D shows two-wheel type of torsional suspension;

FIG. 10-E shows one-wheel type of torsional suspension;

FIG. 10-F shows tiller-type of steering for motorcycle wheels;

FIG. 11 is a perspective of a typical tubular frame of a car;

FIG. 12 is a side view of a full size vehicle;

FIG. 13 is a perspective view of a commercial vehicle;

FIG. 14 is a phantom view of a four-door body structure;

FIG. 14-A shows a bumper variation of FIG. 14;

FIG. 15 shows a phantom view of a two-door sedan;

FIG. 15-A shows another variation of a two-door sedan;

FIG. 15-B shows outside appearance of a two-door sedan;

FIG. 16 is a perspective view of a "travel capsule";

FIG. 17 is a cross sectional view of a typical tubular type body;

FIG. 17-A is a typical cross section of a body side;

FIG. 17-B is a perspective view of a typical seat arrangement;

FIG. 18 is a cross sectioanal view of two bucket seat suspensions;

FIG. 18-A shows typical suspension of a bench type seat;

FIG. 18-B shows still another type of suspension of seats;

FIG. 18-C shows leaf-spring type of suspension of seats;

FIG. 19 is a cross sectional view of a steering wheel;

FIG. 20 is a perspective view of energy storage means.

DETAILED DESCRIPTION OF THE INVENTION

Referring to the drawings wherein like numerals designate like parts throughout this description, FIG. 1 is a general perspective view of the smallest practical embodiment of a motor vehicle constructed according to this invention. Each of its sides FL and FR is configured as an elongated bicycle frame modified as follows: the wheelbase is extended to at least 140 centimeters; all four wheels W are regular bicycle type front wheels of any suitable size, style and tire type. The tops of front wheel forks are modified to be operatively connected to the steering system S configured on the trapezoid principle as taught by previous art of this applicant, Ser. No. 597,311 dated 8-8-75 and as further explained in FIG. 1-B; The seat-tube 2, chain stays 3 and seat stays 4 may be similar to those of any regular bicycle, but the down tube 1 and the bottom tubes 5 are of double tube configuration to provide sufficient rigidity and strength to the assembly. The top ends 8 of the front wheel forks and the seat tubes 2 are modified to operatively accept the frame H of the removable top which may be fitted over with any type of a soft, semi-rigid or rigid cover as desired, with panels of transparent material where needed and other protective means to provide protection against the elements; the frame H when properly secured to members of the chassis would provide modified type of "roll-bar" protection for its occupants. The floor panel G would be preferrably molded of synthetic materials and fitted between and supported by said two sides and the floor members of the vehicle structure transversely interconnecting them and by the central tube C which may be dropped lower at its back portion to provide lower mounting facilities for the engine E positioned to counter-balance the weight of the driver. Two bucket seats K are molded of synthetic material and include head-rest extensions. The engine E is controlled by the accellerator means A and; the brakes are actuated by brake pedal means 9, both controls located in the same manner as in regular automobiles. The vehicle is steered by the front wheels linkage means S comprising adjustably extendable track rod SS operatively actuated by the tiller handle 10.

The means of propulsion for this type of vehicle are better seen in FIG. 3. The engine E may be of the common air cooled variety with horizontal drive shaft 14 to which are secured multistep pulley 15 for forward drive and pulley 19 for reverse drive of the vehicle; between the seat tubes 2 and the wheels W are secured rim-driver housing means 25 configured to slidably and operatively accept drive shaft 18 which is positioned transversely and just ahead of the rear wheels of said vehicle and which has on its outboard ends, operatively attached rim-driver means 20 configured for frictional engagement with the outside circumference of the tires of wheels W; to the mid-portion of said drive shaft 18 are adjustably located and secured the multistep pulley 16 for operative engagement with the engine pulley 15 by means of belt 17 for forward propulsion of the vehicle and a single step pulley 22 for operative engagement with the single pulley 19 for the reverse propulsion of the vehicle by means of the belt 21; the forward clutch assembly 24 and the separate reverse clutch 23 assembly are positioned within each reach of the seated operator of the vehicle by his right hand, while the accellerator pedal A and brake pedal 9 are located within easy reach of the seated operator's feet.

The operational sequence of the vehicle is as follows: after the driver starts the engine E with the pull-cord 12 or by electric starter means, he actuates the clutch 24 by engaging adjustable means 37 to force the clutch idler means 29 to tighten the belt 17 around pulleys 15 and 16, thus not only inducing the engine E to power-propell the drive shaft 18 but also to force it to slide rearwardly in its retainer housings 25 and thereby force the rim-drivers 20 into frictional power engagement with wheels W of the vehicle, thus propelling it forwardly; when it is desired to back up the vehicle, the clutch 24 is disengaged and the reverse clutch 23 is manipulated in similar fashion, inducing the belt 21 by means of pulleys 19 and 22 to propell the vehicle rearwardly.

Since the wheels of this type of vehicle are of the regular bicycle variety and may provide very limited contact area with the road surface travelled, and this may prove insufficient to provide adaquate emergency stopping facilities, a primitive type of an emergency braking means as shown in FIG. 1-D could be provided; its actuating handle Q, secured to the floor G of the vehicle forces the brake shoe 27, into frictional engagement with the road surface Z, thus providing sufficient ground contact to stop the vehicle; the rubber shoes 27 are easily replaceable and of sufficient area to provide needed braking contact with the road surface Z.

The vehicle is steered by tiller means 10 better shown in FIG. 1-B; it is provided with horn button 31 and is slidably extendible from the steering system S by means as 11 and stabilized by means 33 secured to the upper down tube 1; the linkage S is operatively secured to the steering stem 32 of the head set 30, and to reduce the road shock to the front wheel, the spring means 35 in its housing 34 is cooperatively combined with the head tube assembly, and matched by similarly configured spring suspension means over the rear wheels as better shown in FIG. 1-C wherein the seat stays 4 are modified to terminate in specially configured shaft 32-D operatively slidable within the seat-stay tube 30-D which is pivotally secured to the frame tube 2, thus allowing certain amount of travel as indicated by arrow J, while the transverse connecting members T-1 and B-6 will maintain the seat stays 4 in proper alignment at all times.

When a very light type of tubing is used in construction of the vehicle or for its interconnecting transverse members, they may be strengthened at their places of securement to each other by means of specially configured washers as 39 shown in FIG. 1-A, thus preventing the bolted tubes from locally collapsing and helping to distribute the torque loads over larger areas of them; the tubular washers 39 are either of split tubing type, applied to the tubes to which the connecting members are attached to, or of the complete tubular type to be slipped and properly located over the shorter end portions of the connecting members, and if desired, these washers could be long enough to span over plurality of securing bolt means, thus providing as much rigidity to such connections as desired.

FIG. 2 shows an embodiment similar to the one shown in FIG. 1, except that the sides FL and FR are configured of left side stamping assembly 36 and the right side assembly 38, thus allowing for more economical mass production of such vehicles, including the front and rear wheels supportive assemblies, while all other operative and functional components could be taken from regular bicycles whenever advantageous and sufficient to the task; the bottom floor panel G is rigid enough to support seats K and if they are secured to it and to the cross member T in unadjustable manner, the throttle pedal A and brake pedal 9 are of the adjustable type to allow for varied sizes of operators and as indicated by arrow J.

FIG. 2-A indicates how a typical torsiontube as B-4 is secured to provide rigid but resilient connection between side frames 36 and 38 by means of regular bolts while the shorter ends of B-4 are locally reinforced by either regular preformed washers or tubular sleeves as described in FIG. 1-A.

FIG. 4 is a perspective view of an embodiment configured to convert any suitable motorcycle type two-wheel vehicle as Y into a four wheel vehicle of much greater usefulness by connecting it with two side frames FL and FR; since the existing motorcycle serves as one side of the resultant vehicle, the left side structure FL does not have its own front and back wheels but is supported and operatively connected to said existing motorcycle Y by four torsionally resilient means as disclosed in this applicant's Ser. No. 857,566 of Dec. 5, 1977, and specifically by transverse members F,B-4,B-5 and T-1; the wheels of the right side frame FR are preferably of the same configuration and suspended by similar means as the motorcycle and the overall frame structure FR is configured to duplicate the wheelbase, means of positioning and operative securement of all relevant parts so that thus coupled sides will perform in harmony as required to produce efficient four wheeled vehicle stearable by the operator of the motorcycle Y, by means of steering linkage SS and the conventionally adjustable front wheel tie-rod means D. The brake systems are matched with their controls combined for one man operation. Additional interconnecting members as N provide sufficient rigidity and roadability to the combined structure which may be covered by soft, semirigid or rigid means to protect its cargo and guests from elements and may have seats to accommodate several people, thus enabling it to function as a light duty open type taxi and general delivery vehicle while readily convertible into the original motorcycle Y as the conditions may require. The paramount advantage of this four-wheel combination over the common side car with one wheel disclosed in previous art is that it can carry greater loads and is more stable.

FIG. 5 is a side elevational view of a midget roadster with its side frames FL and FR configured from tubing and extended forwardly and rearwardly past the wheels W to provide front and rear bumpers 40 with bumper guards 42; its riders are protected by the rollbar 44 supported by auxiliary braces 43 and the two sides interconnected by torsiontubes as F,F-1,F-2,B-3,B-4,B-5,B-6 and T; the foldable windshield 41 may have adjustable side wings; the roof panel V is partially rotatable about the roll bar 44 for easier access into the vehicle seats K which are adjustably securable to the floor and their back rests secured to the transverse bar T to prevent them from forwardly tilting in severe decelerations of the vehicle. The lap belts 45 are secured to the bottom tube 5 and the center tube C and their upper shoulder harness ends secured either to the roll bar 44 or to the center post P which is located between the bottom center tube C and the mid-portion of the roll bar 44 as better explained in FIG. 17, and this applicants U.S. Pat. No. 3,885,810 of May 27, 1975. This configuration has no doors, but access and exit are facilitated by the recessed step as 47 which serves as an armrest on the interior side of the body shell; the engine E is enclosed by cover EE and may serve as a "rumble seat" accessible by stepping over the bumper 40. The engine pulley 15 transfers its power through belt 17 onto pulley 16 secured to drive shaft 18 and through its rim-drivers 20 into wheels W. Since all wheels would have their own mud guards 49, this type of vehicle could be driven completely stripped except for the floor panel G; or provided with body side panels and the hood cover to protect its riders from road spray of other vehicles; or completely enclosed with soft, semi-rigid or rigid means as desired and dictated by its intended use and functions; the forward portion contains a trunk 48 to carry a spare wheel as indicated by the dashed lines; the rear engine compartment may be also enclosed thus providing additional trunk space around the motor enclosure EE. The stop lights, turn indicators and parking lights are all located as high as possible for better visibility and identification of the vehicle in any traffic pattern on any road so that drivers of all other vehicles will be always able to not only detect their presence on the road but to be aware of their driver's actions and intentions. All electrical accessories may be powered by a storage battery or an electric generator means powered by the engine. The cowl section is covered by padded knee panel 46 configured in such fashion whereby in any type of severe deceleration of the vehicle its occupants knees will be automatically restrained by it, thus helping their bodies to remain in sitting position when restrained by the shoulder harness 45, and if unrestrained, their heads impacting against the padded extension of the knee panel 46. All wheels W are of the simple bicycle front wheel configuration with suitable braking means and easily "dropped out" from their forks for easy removal and replacement. The bumper guards 40 are located at the height of regular road vehicle bumpers, preferably at the "common contact zone" between 35 and 60 cm from the ground. This type of a general "run-about" vehicle could fill the place between the present day bicycle and the regular car and be usable for all types of general errands and local transportation needs.

FIG. 5-A shows how various tubular members comprising the side frame structures FL and FR may be secured together by the use of lugs X and brazing instead of welding them together; lugs as X are configured to accommodate the size of tubes U to be secured together and their angular relationship to each other, allowing the main tubes to slide through without being cut to retain their strength and the auxiliary tubes are just closely fitted in and then brazed to the lugs X as indicated by 53.

FIG. 6 is a side elevational view of an enclosed embodiment of similarly configured vehicle as explained in FIG. 5, designed especially for older people without regular car or any convenient means of public transportation facilities for their local transportation; it is fully enclosed against the elements and pilferage; its rigid side structures are interconnected by transverse members T,T-1,T-2, T-3 and T-4 at its upper structure, F,F-1,F-2 and F-3 at its front and B-3,B-4,B-5 and B-6 at its floor level; it has two doors with Lexan windows as described in FIG. 8-C and is powered by a set of rechargeable batteries 55 secured within rigid cover EE and propelling the vehicle wheels W by means of electric motor EM and rim drivers 20 as taught by previous art such as applicant's Ser. No. 857,567 of Dec. 5, 1977. This embodiment could provide the missing link in the present day transportation problem by satisfying the need between the regular car and the bicycle. Its two seats K may be of the bench type and positioned higher so that its occupants will be riding at the same level as those in regular cars, while the padded dashboard 46 is so configured whereby it will protect even unbelted occupants.

FIG. 6-A is a detail transverse cross-sectional view showing how the bucket seat shell as K is suspended from the tubular frame members N by means of properly located straps 60 which are adjustably secured to the undersides of said seat by strap bracket means 61, said straps being sufficiently long to be of double strength and to allow lowering and raising of said seat K to suit the physical dimensions of its user by shortening or lengthening the strap loops under said seat.

FIG. 7 is a side elevational view of the exterior appearance of slightly larger version of this type of vehicle, configured as a two-door hatchback sedan with front seat for two or three people and an extra seat in the back compartment accessible through the back door; the steering tiller is replaced by steering wheel 10 as better described in FIG. 8-B, and the power plant may be either electrical or as shown in this instance, a vertical-shaft type of aircooled combustion engine. For better identification in any crowded traffic pattern, the stop lights with turn indicators as 50 and reflectorized panels as 51 are positioned as high as possible, while the specially reinforced "common contact zone" CC, located between approximately 35 and 60 cm above the ground serves to reduce any dammage from any unwanted contact with any other vehicle or object while in motion and as taught by previous art of record such as Chika's U.S. Pat. No. 3,997,209 of Dec. 14, 1976. The exterior body panels would be preferably molded of any suitable synthetic material such as Polyethelene and secured to the tubular means of the body frame as suggested in FIGS. 7-A through 7-D which show just four of many possible means of securing such panels.

FIG. 7-A shows the very simplest construction, wherein the fastenning clamp 59, molded of proper synthetic material, is correctly located and secured to the inner surface of the body panel by adhesive cement means as 56 and any common fastener means as 58 is used to secure such clamp 59 to any tubular frame member as F in place.

FIG. 7-B shows the body clamp base 57 adapted for securing to it a metal strap bracket 59 by fastener means as 58.

FIG. 7-C shows a self-formed bracket 59 which is temporarily clamped to conform to the contour of the tube F until the adhesive means 56 dries.

FIG. 7-D shows still another method wherein the body clamp bases 57 are spaced as far apart as needed and the self-forming clamps 59 are secured by fasteners 58; thus the FIGS. 7-C and 7-D illustrate ways to fasten the edges of body panels to the frame structures while FIGS. 7-A and 7-B show how to secure the mid-sections of such panels to whatever rigid supporting means are available.

FIG. 8 is a side elevational phantom view of another embodiment of this invention wherein two rigid structures FL and FR are provided with motorcycle type wheels and suspension means, while FIG. 8-A is a phantom plan view of the same vehicle, therefore they should be considered together for better comprehension of this type of vehicle structure. Generally, the sides of this vehicle are constructed in the manner described previously.

The steering is by an adjustably mounted safety steering wheel 10 which steers the vehicle by means of modified rack and pinion principle as explained in FIG. 8-B. The rear wheels W are propelled by rim drivers 20 powered by either a combustion engine as shown or by an electric motor as explained previously.

FIG. 8-B is a detail perspective view of the modified rack and pinion steering preferred for this type of vehicle. The steering wheel 10 is slidably adjustable forward and back and also vertically as indicated by arrow J to suit the desire of the vehicle driver and securable at any desired operative position by commonly known means.

The steering wheel 10 is adjustably supported by shaft means 32 of angular cross section, adapted to be operatively slidable through pinion means 66 which is rotatably, tiltably secured within a housing 68 which is positioned and operatively supported by two bracing means extending from transverse connecting member F-2. Also secured to said member F-2 is an inverted U-shaped housing 68-F, with vertically elongated opening to slidably accommodate a bushing means slidably accepting front end of said steering wheel shaft 32. The pinion means 66 acts as a fulcrum for tilting of said shaft 32 and the forwardly positioned housing 68-F gives the steering assembly second support and additional stability.

FIG. 8-C is a detail side elevational view showing very simplified system of lowering and raising the door window pane 72, made preferrably of Lexan; the line of the window's front angle 71 is positioned parallel with the back line 69 of the door and rack 66 is secured at the same angle from top to bottom of the window and past the crank handle operated pinion 67 which is easily turned by the car occupant, thus lowering and raising the window as desired; the lower back corner of the window is provided with two roller means 73 for rolling up and down the incline of 69 door frame, while the front edge has roller on its very top and another below the crank handle 67; thus the rail 74 within which the window pane is secured glidably supports the front and bottom edge of it and the four nylon rollers 73 are assuring its smooth adjustability.

FIG. 9 illustrates how a double shafted, reversible, electrically powered motor EM is coupled to the rim drivers 20 by drive shafts 18-2 by means of flexible couplings 54; the motor is immovably secured to the vehicle structure its shaft lined up with the rim drivers 20 when they are in full operative contact with wheels W, and the clutch means are used only to urge them and keep them in such engagement as indicated by arrows J to propell the vehicle as desired, thus the flexible couplings 54 actually never flex except when in the idle position. The necessary connections, speed controls and all other operative accessories are of the well known art and therefore omitted from this disclosure.

FIG. 9-A illustrates how only one wheel could be propelled by the electric motor EM which has its rim driver 20 secured to one of its shafts by flexible coupling or directly, and the assembly is slidably positioned in such manner that the clutch actuates it back and forth into and out of frictional contact with wheel W as indicated by the arrow J; the modified motor support 25-9 comprises slidable bushing means for the other end of the motor shaft; if both back wheels were provided with these individual motors, then the vehicle could be powered by either one of them when not loaded and by both of them when either fully loaded or negotiating adverse driving conditions and terrain.

FIG. 10 is an overall perspective phantom view of a typical vehicle constructed according to this invention. The separate body sides FL and FR, with their own independent means of support for the front and back wheels including their means of suspension and the front wheel steering are clearly distinguishable. The connecting members such as F,T-1,T-2,T-3, and T with B-4,B-5 and B-6 clearly indicate how the two sides are kept in rigid but resilient relationship to each other and how the front and rear bumper bars 40 are functioning not only as bumpers but also as the main spacers and connectors between the front and rear ends of these two sides FL and FR, thus completing the collision deflecting enclosure of the vehicle and providing it with the strongest possible contact areas with any contacting and colliding objects; all other details are omitted in this view for the sake of clarity.

FIG. 10-A is a similar perspective view of a similar vehicle as described in FIG. 10, showing how the sides FL and FR could be configured of stampings instead of tubular means and clearly indicate how these sides would appear; the exterior panels could assume the same contours whether produced from metal stampings or molded of synthetic materials, or any suitable combinations of both means; the connecting members B-7 and B-8 are shown to indicate another way bumper bars 40 could be supported by the reinforced stampings of the body shell; the torsiontube B-6 is connected to inboard legs of chain-stays 3, thus keeping the rear wheels in proper alignment and acting as a modified sway-bar for them.

FIG. 10-B is a perspective view of the final appearance of the body configuration shown in FIG. 10-A, showing that its appearance would be compatible with the accepted look of such mini vehicles and that it could follow any trend set by the market conditions and public acceptance, regardless if its frame structure would be of tubular or stamped configuration and its exterior body shell of either metal stampings or molded synthetic materials; the back door provides access for rear compartment passengers and cargo and while the right side of the space between the bumpers 40 would provide space for the license plate, the left side could have recessed step as 47 to facilitate stepping over the top bumper bar 40 when entering and exiting the rear compartment. The sun-roof panel 75 is hinged at the front, is opened, adjustably positioned for ventilation and securely shut by locking means 77 and its hinge pins are easily removable so that the whole panel may be completely removed and stored away, for real sun-roof effect or insertion of transparent panel of Lexan for skylight effect.

FIG. 10-C is a detail perspective view of a side door 78 configured to reach only to the common contact zone CC which is specifically reinforced to resist penetration of the passenger compartment by any colliding body, with the recessed step 47 providing easier entrance and exit to the vehicle interior; the door 78 may be hinged in a conventional manner at its front edge or at its top to allow it to swing upwardly as shown by arrow J, or to make the door slidable as indicated by arrow J-J with the slidably supporting rail 76 configured into the top of the reinforced portion CC.

FIG. 10-D is a detail perspective showing how the torsiontubes B-5 and B-6 of FIGS. 10 and 10-A are configured to serve as means of suspension for their wheels, to either supplement or completely replace the telescopic shock absorbing type of seat stays; in configuration where the torsion tube B-5 is provided with its shorter end portions in double form, thus assuming the function of wheel stays 3, its mid portion is rigidly secured to the center tube C, by means as C-10 which prevent torsional rotation of the torsion tube B-5 within it; the torsiontube B-6 would serve as a sway bar and wheel stabilizer means; the means c-10 could provide selective immobilization of the torsiontube B-5 within it, thus providing varied types of suspension rigidity and response as required for anticipated usage of the vehicle.

FIG. 10-E is another modification of this type of torsional suspension wherein the B-5 torsiontubes are in two halves, their inboard shorter ends secured to the central tube C by housing CC; the modified chain stays 3 are secured to the transverse portion of B-5 which has its shorter inner end portion modified for securement to the central tube C by easily removable housing CC.

FIG. 10-F is a detail perspective showing how the steering system track arms S is secured to any motorcycle front wheel fork which has telescopic shock absorbers; the adjustable length track rod S-S is pivotally secured to track arms S, with the arm on the driver's side extended and modified by means as 11 to adjustably, extensibly accept the tiller 10 to suit the desires of the driver; the track arm S are secured to the tops of front fork assemblies by the same bolt means as are used to secure regular handlebars, and the whole assembly could be used in its standard motorcycle configuration and secured to the modified head tube by the expander bolt 79 commonly available.

FIGS. 11 through 15 illustrate various modifications of the basic concept of this invention of constructing the automobile vehicle frame and body as it would be applied to larger transportation vehicles.

FIG. 11 is an overall perspective view of a vehicle frame structure comprising two separate sides FL and FR interconnected by plural transverse connecting members as F,F-1,T,T-1,T-2 and T-3 on its top contours, while its floor is supported by members B-3, B-4,B-5 and the centrally spaced C positioned longitudinally; its front bumper is integrated by members B, B-1,B-2 and B-3 and its back bumper by members B-6,B-7,B-8 and B-9, thus comprising complete peripheral frame structure to resist any type of a collision or impacting of any object against it.

FIG. 12 is a side elevational view of a full size four door sedan body showing how any required number of transverse members marked T through T-4,F through F-7 and B to B-9 may be strategically positioned to connect left and right sides of such vehicle body to form a very rigid and safe structure.

FIG. 13 is a perspective view of a commercial vehicle body structure showing the extent of applicability of this type of construction method to all types of commercial vehicles from the smallest quarter ton pick-up to such vehicles as trucks, vans, buses and any other type of transportation vehicle where this type of construction would offer advantages; the transverse members B-5,B-6,B-7 and B-8 could be modified to accept or operatively connect with the upper structural members B-5-1, B-6-1, B-7-1 and B-8-1 and similar configurations of body construction could be applied to vans, large tractor trailers, buses and other vehicles which are subject to any type of a collision hazards.

FIG. 14 is a perspective view of a conventional four-door sedan showing in heavier lines how its right side FR could be completely assembled and welded, easily rustproofed and primed before being connected with its symmetrically opposite left side FL by means of plurality of transverse connecting members to form one complete transportation vehicle structure, and how even the whole half could be more economically replaced after a side collision instead of scrapping the whole vehicle, thus providing greater overall opportunity to salvage many more of collision damaged vehicles than is presently economically practical.

FIG. 14-A is a detail perspective of a collision deflecting bumper means configuration disclosed in previously mentioned art, as it would appear in its modified form for use with the present invention and in its non-retractable form configured to avoid most head-on collisions by converting them into deflective glides against the impacted or colliding object.

FIG. 15 is a perspective rear view of a compact type three door vehicle of generally conventional appearance showing how the system of construction as disclosed in this invention is applicable to its construction; the heavier outline indicates the right side FR and how it is connected to the left side FL by plurality of connecting members as previously described; the back door 74 could be hinged from the cross bar T-2 and the whole roof portion spanning T,T-1 and T-2 may be configured to be removable in separate panels, thus providing a small opening between T and T-1, or larger opening between T-1 and T-2, or leaving both of them open, and if the window in the door 74 was lowered, exposing the whole span from the header bar as T to the lower portion of the door 74, thus providing a safety type convertible as disclosed in previous art and the transverse members T,T-1 and T-2 acting as roll-bars for the vehicle if it was involved in a roll over type of accident.

FIG. 15-A is another rear view of similarly configured vehicle incorporating modification of the deflector type bumper as described in FIG. 14-A; the rear trunk opening line allowing another torsional cross beam T-6 to strengthen the rear quarter of the vehicle; the double roll bar means as T and T-1, T-2 and T-3,T-4 and T-5 would provide the greatest amount of safety for its passengers in a roll over collision; any of the five roof panels between T-1 and T-6 could be of the removable, slidably adjustable or tiltable configuration, thus permitting great variety of open and closed combinations.

FIG. 15-B shows the exterior view of the same basic concept as disclosed in FIG. 15-A, with the double roll bars T and T-1,T-2 and T-3,T-4 and T-5 spanned by rigid, permanently secured panels as TF, TM and TB, thus concealing them from view but increasing their effectiveness as very strong structural reinforcements for the vehicle roof. This type of roof structure would lend itself even to vehicles of present day conventional configuration and sizes, wherein any type, style and size of vehicle would be left untouched in any manner below its roof line, but the roof panel area between its roof rails RR would be modified as follows:whenever this type of safety convertible structural configuration would be desired, the transverse members T through T-6 would replace the existing conventional roof panel supports and the roof area would assume the general appearance as seen in FIGS. 15-A and 15-B if double transverse members were used and as seen in FIG. 15 if said members were used singly; then the mid portion of the roof from its windshield to its back window or its trunk line could be treated in any manner and covered or uncovered at the discretion of its owner, by employing rigid, semi-rigid or soft panels of natural or synthetic materials, either of opaque, translucent or transparent composition, thus giving him a choice to ride in a completely opened safety convertible; under partial sun-roof panels over front, back or both seats; under transparent or translucent sky panels; if the roof panels were of rigid configuration, they could be easily stacked in the vehicle trunk when not used; some of them could be configured to be slidably adjustable to provide for controlled ventilation, or hinged to be adjustably opened and closed either by hand or by remotely controlled mechanical means as explained in FIG. 10-B; in temperate zones the whole roof portion could be protected against sun and rain by a zipped-in soft vinyl material as sometimes applied to metal type roofs of cars for styling appearance only, but for winter weather, a semi-rigid insulating panels would be secured over the transverse members and supported by them, looking like headlining from the interior side but its exterior sides covered by the same zipped-in soft top cover.

FIG. 16 is a perspective view of a coupe type body configuration of a passenger compartment which would fit over the frame work as disclosed in FIG. 1 in the following manner:in its minimal configuration, only the floor panel G supporting the engine and one or two seats is essential; for light protection against the road splash and dirt the body panels 83 would be fitted over the frame tubes, and they could be of any suitable material of soft, semi-rigid or rigid configuration, thus providing protection below the belt line of the vehicle defined by transverse members F and T; the rigid tray portion 77 could serve as a platform to carry tethered cargoes or a guest rider besides the propulsion means of the vehicle; above its belt line the frame structure H could be provided with Lexan type windshield 82 and the roof panel 80 configured of any soft or semi-rigid material and either snapped over tubes H or secured to them by fasteners as 81; this economical configuration would be desirable especially in temperate climates and for the lightest of duties of transport up to three people or equivalent cargo and usable as:

1. just a driving platform with only the floor pan 77 to hold the seats, without any structure above the belt-line;
2. with the upper structure H to provide roll bar type of protection for its riders during roll over collision;
3. with the lower panels 83 to provide protection against road splash;
4. with the Lexan windshield 82 added to the upper structure H;
5. with the roof panel 80 added for shade;
6. with panels 78 added to the upper portion of doors and the back upper portion of the enclosure, either of all clear Lexan or just with clear panels 79, all of these cover means configured of either soft materials secured to the frame structure by snap fasteners 81 or zippers, of semi-rigid synthetic materials configured to be snapped over said frame structure, or of metal stampings as commonly used in automotive industry. The paramount object is to provide the utmost protection for the occupants of thus configured travel capsule when desired, while leaving the rest of the vehicle more expendable in order to save weight, and this type of approach could be used in all of the disclosed embodiments, simply by placing all possible strength to those components constituting the immediate periphery of the passenger compartment of the vehicle, while the rest of the vehicle structure would be engineered just strong enough to perform the vehicle's operative function in line with its intended use, and this type of safety oriented approach to automotive body building can be applied even to all conventionally built automobiles by simply incorporating in its structure plurality of transversely positioned rigid members to provide utmost protection for its occupants, as can be clearly visualized by looking once more at FIG. 12, wherein the whole body could be constructed in conventional manner, but the following transvers members as F,F-1, F-4,F-5,F-6 and F-7; T,T-1,T-2,T-3 and T-4; B-3,B-4,B-4B,B-5 and B-6 would be incorporated into the immediate periphery of its passenger compartment, thus making it relatively much stronger than the rest of the body structure. This approach of localized structural reinforcement by the presently disclosed concept of transverse members may be used also to relatively strengthen the front and back bumpers and their supports in order to provide improved crash resistance of existing vehicles and to help to comply with various government bumper standards and regulations regarding the reduction of costs of low speed collisions; thus the transverse members as F-2,F-3,B,B-1 and B-2 could be incorporated into the front bumper structure and B-7,B-8, and B-9 into the rear bumper structure of the vehicle shown in FIG. 12 to provide necessary rigidity and collision deflective qualities to these portions of the car; and when it would be desired to provide sufficient support for the whole "common contact zone" without changing the whole body structure, only those of the transverse members located within that zone could be incorporated into its structure while leaving the rest of the car unaffected and in its usual configuration.

FIG. 17 is a cross sectional transverse view looking back from the dashboard of the vehicle showing the typical interior configuration of a preferred embodiment of the very smallest closed body type constructed according to this invention; the tubular member F-3 is positioned transversely behind the seats K which are adjustably attached to it by straps 60 to keep them from tilting forward in any collision, while their bottoms are secured immovably to the reinforced portions of floor G by means as shown in FIG. 17-B. The central post 84 as disclosed in previous art of Chika, U.S. Pat. No. 3,885,810, of May 27, 1975, reaches from the transverse roof member T-3 to the floor center tube C; each shoulder harness 45 is secured to the floor tubes FR or FL on their outboard sides and to the center tube C on their inboard sides with their shoulder straps adjustably secured to the central post 84. The outer body panels 86 are of molded synthetic material secured to the structural members as N by any suitable means as explained in FIGS. 7-A, through 7-D and as seen if FIG. 17-A, with the padded panels of interior trim 85 configured to provide utmost protection to car occupants in any type of a collision of the vehicle. The seat shells K are molded of qualified plastic material, have built-in head rests and may have perforations for ventilation as needed and padded seat cushions if desired; they are easily secured to the floor G in several locations to better accommodate the size of the driver, or may comprise any type of suspension and shock absorbing means as follows: for the lightest type of cushioning means the air cushion as 87, which can be inflated to match the weight of its intended users, and it could be in form of a small innertube 88 with the bottom of the seat shell K molded to keep it correctly positioned at all times while allowing some adjustability over the floor G; also, the seat shells could be just suspended by seat strap means 60 from the adjacent structural members as 5 and N, as shown in FIG. 6, thus allowing the height adjustment of seats by simply manipulating the straps to extend or shorten their loops.

FIG. 18 illustrates another way of securing seats K to the floor and combining the coil spring 89 with straps 60 on one of the bucket seats while the other one shows two leaf-type springs 90 attached to the floor G and bottom of the seat K.

FIG. 18-A shows a bench type seat shell supported by one heavier coil spring 89 in its mid section and two smaller springs 91 on outboard sides, assisted by the side limiting springs 92 to control the lateral movement of the seat.

FIG. 18-B shows another bench seat supported by plurality of coil springs 89 and means 93 to control the side sway and upward movement of the seat; also, the springs could be replaced by plurality of air cushions as 87 in FIG. 17.

FIG. 18-C shows a bench type seat K with combination of leaf spring 90 and coil spring 89 and side springs 92. All embodiments disclosed in FIGS. 17 through 18-C are intended to show the very minimal and spartan type accommodations to save the weight and cost. as an example, the seat-shell type of seat would be quite acceptable for trips of short duration and it would weigh fraction of any regular automotive seat, and when vehicles would be increased in size and engines, the appurtenances of these interiors would be configured accordingly with the demands of the market conditions.

FIG. 19 shows the steering wheel 10 produced with utmost safety and economy; as seen in perspective in FIG. 8-Band 10, it has a large circular panel 95 allowing only sufficient room between its rim and its circular panel for efficient manipulation of the wheel; the rim comprises metal rod 96 enclosed in molded plastic and the wheel hub 97, composed of slow recovery compressible materials is faced with easier compressible foam ruber pad 98; thus, under severe pressure the assorted materials would progressively compress and then slowly recover, the semi-rigid cover panel 95 returning to its original position.

FIG. 20 is a perspective detail view of a modified power train as shown in FIG. 3, but with a kinetic energy retrieving, storing and releasing means assembly 99 to supplement the power of the regular combustion engine E, thus providing a hybrid type of a vehicle which would function as follows: the vehicle is propelled by means of power drive shaft 18 turned by whatever propulsion means desired: the shaft 18 is operatively connected by clutch means as 101 and reversible ratchet and pawl means as 102, all combined into one assembly 100 slidably mounted to the structure of the vehicle and configured to move back and forth as indicated by arrow J in unison with the drive shaft 18, and so configured that while the vehicle will be propelled by its propulsion means in normal fashion, every time it is being decelerated by applying the brakes the clutch means 101 will be automatically actuated to permit the spiral springs which are installed in interconnected series to absorb the energy required to stop the vehicle, and keep the energy thus gathered stored in them and available for release whenever the vehicle is to be propelled again, and whenever its operator shifts the vehicle into forward speed and actuates its throttle, the clutch means 101 will also be actuated and cause the stored kinetic energy to be released into the drive shaft 18. This automatic process repeats itself to lesser or greater degree at all times while the vehicle is traveling, unless its operator manually disengages such means.

Thus it could be used whenever it is desired to augment the power of the vehicle's propulsion means and to provide it with additional power assist means at the will of its operator. This system of energy storage is adaptable to any type of propulsion system. receives the energy to be stored directly from the drive shaft 18 and discharges it back directly into it, at the will of the vehicle driver or automatically, without any intermediary conversion means.

In conclusion, this unique concept of employing the torsionally resilient transversely positioned connecting and bracing means as presently disclosed may be introduced and incorporated into the structural configurations of existing vehicles gradually and selectively, starting with such localized areas as the customizing of already produced vehicles with various embodiments of sun roofs; designing truly safe convertibles wherein everything below the belt line would be unaffected; strengthening the existing bumpers to meet their minimum standards without increasing their weight too much; strengthening the passenger capsule to protect its occupants in side impacts, and strengthening the weak "common contact zone" all around the vehicle periphery are just a few applications where this invention could prove beneficial.

All of the above described embodiments are configurations of this invention are only illustrative of the great scope of this concept in configuring these types of light, economical and safe four-wheeled motor vehicle frames and bodies to provide not only the new means of personal and economical urban and suburban transportation for all types of people and cargo, but also providing entirely unique concepts for developing new ways to construct automobile vehicle structures in general.

Therefore it should be understood that endless variations of the disclosed and implied embodiments are possible, and that all types of auxiliary and accessory means implementing and enhancing the functionally operative and efficient usage of them may be incorporated, combined or added to them without departing from the spirit and scope of the attached claims.

I claim:

1. A four-wheeled motor vehicle constructed from two exclusively configured left and right longitudinal side-structures operatively interconnected by plural, transversely positioned connecting and bracing members;

each side structure operatively supporting a front wheel adapted for steering and a rear wheel adapted for driving;

each bracing member comprising a longer mid-portion and two shorter end-portions; each longer mid-portion positioned substantially horizontally and transversely between said side-structures; each shorter end-portion positioned substantially at a right angle to said mid-portion and operatively secured to correspondingly located rigid portions of said side-structures at plural points along said rigid portions;

said longer mid-portions supporting a floor and seats of said vehicle, a steering system operatively coupling the front wheels of said side-structures, a propulsion means adapted to drive at least one rear wheel of said vehicle, controlling means to efficiently operate said vehicle from the seat of its operator.

2. A vehicle of claim 1, including bracing and connecting members interconnecting the front and back end contours of said side-structures which are sufficiently reinforced to serve as front and back bumper means for said vehicle.

3. A vehicle of claim 2, wherein said longitudinal sides are specifically reinforced at the height of said reinforced front and back-end connecting and bracing members.

4. A vehicle of claim 3, wherein said longitudinal sides and said front and back-end connecting members constitute the most rigid structural components of said vehicle.

5. A vehicle of claim 4, with its strongest structural components located in proximity of the passenger compartment of said vehicle.

6. A vehicle of claim 1, wherein each said shorter end-portion of said connecting members are secured to said longitudinal sides by plural bolt means.

7. A vehicle of claim 1, wherein said connecting members are configured of tubular means, each of their shorter end-portions are connected by bolt means to reinforced structural members of said longitudinal sides at two spaced-apart locations.

8. A vehicle of claim 7, wherein said shorter end-portions of said connecting members are sufficiently reinforced to prevent their collapse when they are bolted to said longitudinal sides.

9. A vehicle of claim 7, wherein said bolt means of securement comprise pressure distributing means to prevent deformation of said tubular connecting members.

10. A vehicle of claim 1, wherein the structural members of said longitudinal sides serve as means of attachment and support for the exterior body panels of said vehicle.

11. A vehicle of claim 10, wherein said body panels are configured of materials which resist penetration under pressure of impacting object by deforming without rupture and slowly regaining their previous shape when such pressure ceases.

12. A vehicle of claim 1, wherein said longitudinal sides comprise structural frames of welded metal stampings with individual body panels removably secured to them.

13. A vehicle of claim 1, wherein said longitudinal sides comprise frames of tubular means to which adjoining body panels are secured.

14. A vehicle of claim 1, wherein said longitudinal sides comprise structural frames and body panels combined and molded of synthetic materials.

15. A vehicle of claim 1, wherein said longitudinal sides comprise metal frames to which body panels of synthetic materials are secured.

16. A vehicle of claim 1, wherein said longitudinal sides are of all-metal construction.

17. A vehicle of claim 1, wherein the longitudinal sides comprise side openings for ingress and exit for its passengers, and including a foldable windshields.

18. A vehicle of claim 17, comprising removable roll-over protection means over which removable roof and side panels are securable.

19. A vehicle of claim 1, wherein said longitudinal sides comprise doors and windows operatively incorporated into their structure, thus determining complete side-elevational contour of said vehicle, from bumper to bumper and from its floor to its roof.

20. A vehicle of claim 19, wherein said longitudinal sides comprise roof rails interconnected by at least one of said bracing members.

21. A vehicle of claim 20, wherein exterior panels are secured to said longitudinal sides and the intermediate transverse spaces between the side-elevational contours of said longitudinal sides of said vehicle also include exterior reinforced panels.

22. A vehicle of claim 20, wherein intermediate spaces between said roof-rails include panel means for adjustable opening.

23. A vehicle of claim 20, wherein said roof rails and the respective interconnecting members are removeable from said side structures.

24. A vehicle of claim 22, comprising windshield and backlite window assemblies supported transversely by reinforced connecting members and vertically by the rigid structural members of said longitudinal sides.

25. A vehicle of claim 1, comprising brake system operatively functioning on all four wheels of said vehicle and controllable in unison by operator of said vehicle, including an emergency type brake means providing greatly enlarged contact area for frictional contact with the surface of the road traveled.

26. A vehicle of claim 17, wherein said longitudinal sides reach up to the bottom of said windshield and comprise means of support for removable roof structure means for said vehicle.

27. A vehicle of claim 17, its longitudinal sides comprising lower door panels, removable roll-over means for protection of users of said vehicle; soft and semi-rigid protective panels securable to said roll-over means.

28. A vehicle of claim 1, wherein the longitudinal sides of said vehicle comprise only frame structures with attachable and removable protective panels of rigid and semi-rigid materials.

29. A vehicle of claim 1, wherein said longitudinal sides are operatively supported by front and rear wheels of commonly available bicycle wheels.

30. A vehicle of claim 1, wherein said longitudinal sides are operatively supported by means of front and rear wheels of commonly available motorcycles.

31. A vehicle of claim 1, wherein said longitudinal sides are operatively supported by commercially available automobile wheels, and including means of operative suspension of said wheels secured to members of said longitudinal sides.

32. A vehicle of claim 1, wherein said steering system is configured on the modified principle of trapezium linkage, two track-arms and adjustable track-rod and tie rod means.

33. A vehicle of claim 32, wherein said track arms are secured on their front ends to the top portions of front wheel stems; their back ends extending substantially rearwardly and inwardly to be rotatably attached to a two-section, length adjustable track-rod means comprising the shorter transverse side of said trapezium linkage system; said tie-rod means constituting the longer transverse side of said trapezium linkage geometry.

34. A vehicle of claim 33, wherein the track-arm on the driver's side of the vehicle includes tiller means, adjustably extended therefrom to serve as an adjustable tiller means to steer said vehicle.

35. A vehicle of claim 32, wherein said track-rod means comprise sufficient length of rack means positioned in front of the driver of said vehicle; said rack means configured for operative engagement with specifically configured pinion means through which an angularly configured steering wheel rod adjustably slides and locks to position a steering wheel in desired proximity to the driver of said vehicle.

36. A vehicle of claim 35, comprising a housing secured to the nearest cross member interconnecting said longitudinal sides and provided with vertically slidable bushing means slidably accepting the forward portion of said steering wheel rod, thus permitting the vertical adjustment of it by tilting its rod on the fulcrum point of said pinion means, means to lock it in any desired angle of inclination.

37. A vehicle of claim 35, wherein the hub of said steering wheel is configured as a modified cone filled with shock absorbing materials.

38. A vehicle of claim 1, wherein all wheels are rotatably supported by short, individual axles as commonly used on bicycles and motorcycles, each axle supported by plural side members operatively integrated into said longitudinal side structures.

39. A vehicle of claim 1, wherein all wheels are provided with separate, narrow fenders as commonly used on bicycles and motorcycles.

40. A vehicle of claim 1, wherein said means of propulsion comprise a combustion engine, means to transfer its power to at least one of the rear wheels of said vehicle by means of frictional engagement between the tire of said wheel and specifically configured friction roller means operatively coupled to said engine.

41. A vehicle of claim 40, comprising means to transfer the power of said combustion engine into said frictional roller means by belts operatively interconnecting assorted pulley means.

42. A vehicle of claim 1, wherein said means of propulsion comprise variable speed, reversible, double-end shaft electric motor means powered by rechargeable batteries; each end of said motor shaft flexibly secured to an extension drive shaft comprising on its other end specifically configured frictional roller means to transfer the power of said motor into tires of said rear wheels of said vehicle.

43. A vehicle of claim 42, wherein said electric motor is permanently secured to the floor of said vehicle, said extension shafts are secured to said motor shafts by flexible means, their roller means brought into and out of frictional contact with said wheel tires by clutch means actuated by the vehicle operator.

44. A vehicle of claim 42, wherein one wheel is driven by electrically powered, variable speed, reversible, single-end shaft motor means slidably secured to said vehicle floor in proximity of the tire of the wheel of be driven; clutch means controllable by the vehicle operator is slidably actuate said motor with its roller means into and out of frictional engagement with said tire.

45. A vehicle of claim 44, wherein each rear wheel is driven by electrically powered motor, both selectively controlled by the vehicle operator.

46. A vehicle of claim 1, wherein said means of propulsion of said vehicle are assisted in propelling it by means of energy retrieving, storing and releasing means which retrieve some of the kinetic energy otherwise lost every time said vehicle is being decelerated by the use of its braking system, and which later release such stored energy to provide better accelleration for said vehicle.

47. A vehicle of claim 46, wherein said energy saving means function automatically, comprising means which automatically activate said energy retrieving process whenever said vehicle's braking system is engaged and automatically release its stored kinetic energy into said vehicle wheels whenever its operator activates controls for its forward accelleration.

48. A vehicle of claim 47, wherein said energy retriever means comprise plural, flat, spiral spring means configured to be wound up in sequence whenever the operator of said vehicle activates brakes of said driven wheels; means to keep the kinetic energy thus retrieved, accumulated and stored in said plural spring means up to their capacity; means to automatically release it into said wheel tires through said roller means only after the operator deactivates said braking system, the drive selector means are in "forward" position and he activates the accelerator means of said vehicle.

49. A vehicle of claim 1, comprising individual front seats with built-in head rests, configured from synthetic materials in form of a seat shell, adjustably suspended by resilient means between rigid members of said vehicle structure and lockable in preselected positions to prevent their tilting and dislocation during sudden deceleration of said vehicle.

50. A vehicle of claim 49, said seats comprising body restraining means adjustably anchored to rigid structural members of said vehicle at their lower ends, their upper ends adjustably securable to centrally located generally vertically extending post means.

51. A vehicle of claim 50, wherein said "post means" is positioned vertically between rigid members of the floor and a roof of said vehicle structure at its transverse center and back of said front seat.

52. A vehicle of claim 49, wherein said seats are supported on said floor by air chambers pressurized to suit the seated occupant's weight and comfort.

53. A vehicle of claim 49, wherein said seats are supported by combination coil and leaf spring means assisted by restraining strap and spring means.

54. A vehicle of claim 51, wherein at least one of said connecting members is located transversely and directly back of the upper portion of the front seats of said vehicle.

55. A vehicle of claim 34, wherein said one connecting member is interconnected with the vertical post means.

56. A vehicle of claim 21, wherein the interior surfaces of said vehicle which are able to inflict injuries to decelerating bodies of said vehicle occupants during a collision are covered with shock absorbing materials which temporarily deform under severe impact against them.

57. A vehicle of claim 1, comprising padded, contoured knee panel means positioned to engage the knees of seated occupants of said vehicle and other padded pane means positioned to engage the head of the seated occupant during its severe deceleration.

58. A vehicle of claim 19, wherein said windows are of clear synthetic materials including door windows adjustably retractable by means of suspension frame means slidably supported at three of its corners by modified roller means operable within two spaced apart channels.

59. A vehicle of claim 19, wherein the side doors of said vehicle are longitudinally, rearwardly slidable over channel means configured into roof-rail and door-sill structural members of said vehicle.

60. A vehicle of claim 1, wherein two of said transverse connecting members are positioned in poximity of the rear wheels of said vehicle, each said rear wheel being supported by swing arms pivotally connected to said side structure about a transverse axis, one shorter end-portion of each secured to the inboard side of the swing-arm of the adjacent wheel, its opposite shorter end-portion secured to rigid structure of the opposite side structure of said vehicle.

61. A vehicle of claim 1, wherein two of said transverse connection members are posotioned in proximity of the rear wheels of said vehicle, each said rear wheel being supported by swing arms pivotally connected to said side structure about a transverse axis, one shorter end-portion of each secured to the inboard side of the swing arm of the adjacent wheel, its opposite inboard shorter end-portions operatively secured to centrally and longitudinally positioned rigid members of said vehicle structure.

62. A vehicle of claim 60, wherein said two transverse connecting members to function as torsional sway-bar means, torsional wheel alignment means and torsional body stabilizing means.

63. A vehicle of claim 1, wherein said transverse connecting members are configured with additional bends in them as required for their effective installation and use within the structure of said vehicle.

64. A vehicle of claim 40, wherein said at least one rear wheel is supported from said side structure by suspension means for providing vertical movement of the wheel, and said roller means are located in closest practical proximity to that portion of said wheel tire periphery which is least affected by the operative function of its means of suspension.

65. A four-wheeled motor vehicle two exclusively configured left and right longitudinal side structures, and plural, transversely positioned connecting and bracing members; wherein each side structure is operatively supported by two wheels attached thereto, one of them capable of steering; each connecting member comprised of a longer mid-portion and two shorter end-portions; each longer mid-portion positioned transversely between said longitudinal sides, each shorter end portion secured at two spaced apart locations to correspondingly opposite sections of said sides; means to operatively connect the two steerable wheels for common steering; a propulsion means to propel at least one of said wheels; operating control means for steering said wheels and controlling said propulsion means.

* * * * *